(12) United States Patent
Ohara

(10) Patent No.: US 10,542,170 B2
(45) Date of Patent: Jan. 21, 2020

(54) IMAGE COMMUNICATION APPARATUS AND METHOD THEREFOR

(71) Applicant: CANON KABUSHIKI KAISHA, Tokyo (JP)

(72) Inventor: Eiji Ohara, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 15/707,374

(22) Filed: Sep. 18, 2017

(65) Prior Publication Data
US 2018/0091675 A1 Mar. 29, 2018

(30) Foreign Application Priority Data
Sep. 23, 2016 (JP) ................................ 2016-186141

(51) Int. Cl.
*H04N 1/00* (2006.01)
*H04N 1/327* (2006.01)

(52) U.S. Cl.
CPC ..... *H04N 1/00896* (2013.01); *H04N 1/00026* (2013.01); *H04N 1/00899* (2013.01); *H04N 1/32708* (2013.01); *H04N 1/32763* (2013.01)

(58) Field of Classification Search
CPC .... H04M 19/08; H04M 3/02; H04N 1/00896; H04N 1/32763; H04N 1/32708; H04N 1/00026; H04N 1/00899
See application file for complete search history.

(56) References Cited

U.S. PATENT DOCUMENTS

| 5,790,640 A | * | 8/1998 | Tassa | .................. H04N 1/00206 358/407 |
| 6,822,764 B1 | * | 11/2004 | Okabe | .................. H04M 19/08 358/442 |
| 2004/0161103 A1 | * | 8/2004 | Pierce | .................. H04M 19/08 379/413 |
| 2007/0094459 A1 | * | 4/2007 | Suzuki | .................. G06F 12/023 711/156 |
| 2013/0083910 A1 | * | 4/2013 | Baba | .................. H04M 11/007 379/100.01 |

(Continued)

FOREIGN PATENT DOCUMENTS

JP 2002344566 A 11/2002

*Primary Examiner* — Akelaw Teshale
(74) *Attorney, Agent, or Firm* — Canon U.S.A., Inc. IP Division

(57) ABSTRACT

An image communication apparatus, to communicate with a telephone set, includes a first control unit, a detection unit, a generation unit, and a second control unit. The first control unit controls the image communication apparatus. The detection unit detects an occurrence of a telephone set off-hook state. The generation unit generates a pseudo-CI signal for ringing the telephone set or an intermittent off-hook voltage to be supplied to the detection unit. The telephone set is connected to a communication line or the generation unit. The second control unit controls the generation unit. Where the telephone set is controlled to wait for a call without being allowed to ring in a power-saving state, the telephone set is connected to the generation unit and placed in the power-saving state. In the power-saving state, the second control unit controls the generation unit to supply a generated intermittent off-hook voltage to the detection unit.

8 Claims, 8 Drawing Sheets

(56) References Cited

U.S. PATENT DOCUMENTS

| | | | |
|---|---|---|---|
| 2014/0369490 A1* | 12/2014 | Koizumi | H04M 1/82 379/377 |
| 2016/0036596 A1* | 2/2016 | Fukushima | H04N 1/00002 370/241 |
| 2016/0105581 A1* | 4/2016 | Hikichi | H04N 1/00891 358/1.14 |
| 2017/0070630 A1* | 3/2017 | Kozuka | H04N 1/00891 |

* cited by examiner

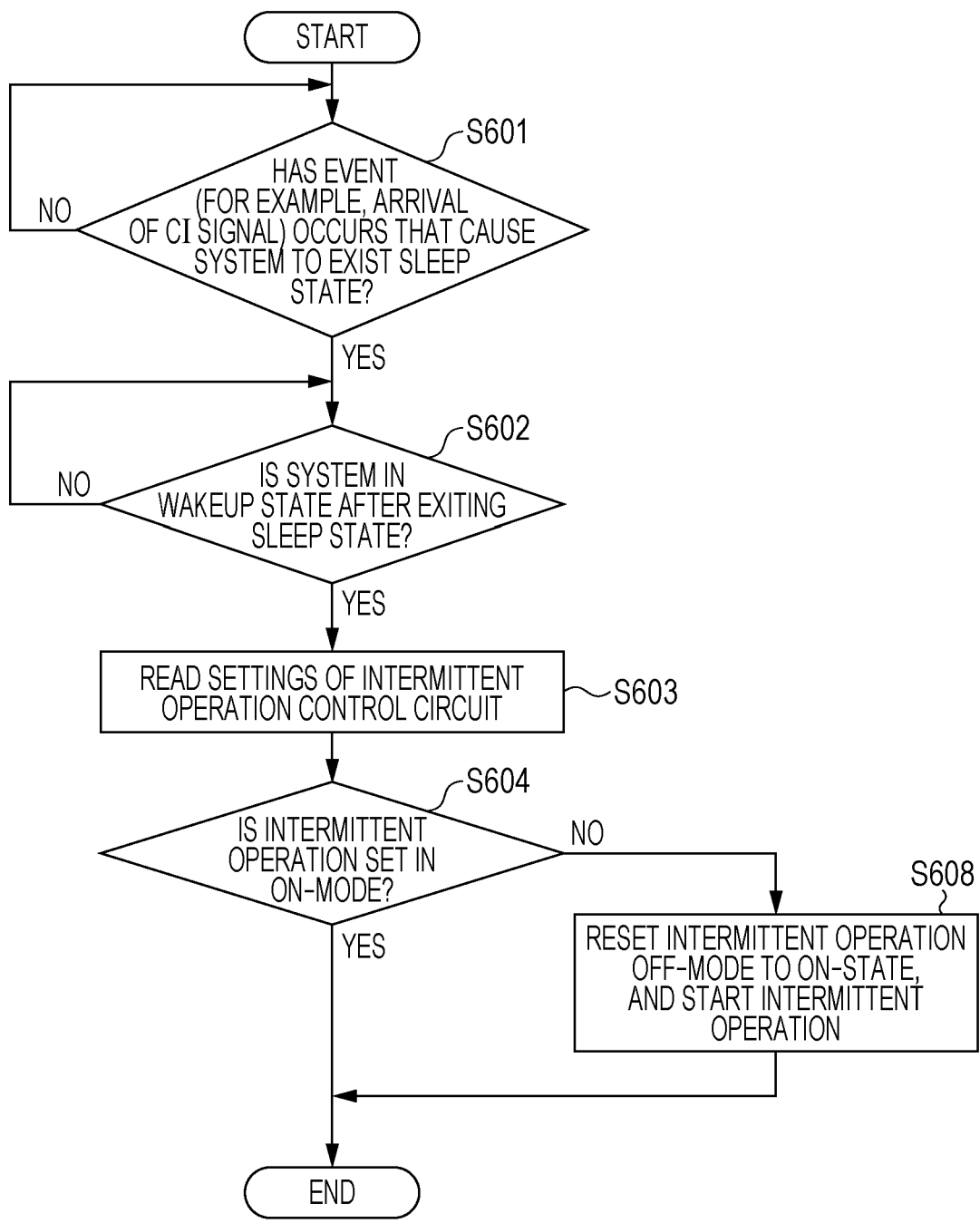

IMAGE COMMUNICATION APPARATUS AND METHOD THEREFOR

BACKGROUND OF THE INVENTION

Field of the Invention

The present disclosure relates to an image communication apparatus and a method therefor.

Description of the Related Art

As one of conventional image communication apparatuses such as a facsimile, an apparatus is known which has a function of accepting incoming calls without ringing such that when an incoming call arrives, a determination is automatically made without making a ringing sound on an associated telephone set as to whether the call is an image communication call or a telephone call. In this function of accepting calls without ringing, if it is determined that an incoming call is an image communication call, the operation proceeds to an image reception process, but if it is determined that the incoming call is a telephone call, a pseudo incoming call signal (pseudo-CI signal) is applied to a telephone set (an associated external telephone set) thereby ringing it or causing a speaker of the apparatus to make a ringing tone to notify a user of the arrival of the incoming telephone call.

In recent years, many countries have established regulations in terms of maximum consumption power of electronic devices. Also for image communication apparatuses, a regulation has been proposed to reduce consumption power depending on a recording speed. For example, Japanese Patent Laid-Open No. 2002-344566 discloses a facsimile apparatus having a function of accepting calls without ringing such that the apparatus waits for an incoming call to arrive in a state where an associated external telephone set is disconnected from a telephone line (that is, in a waiting mode without ringing). In the waiting state, the telephone set is supplied with an off-hook voltage via a DC-DC converter and a ringing circuit such that two different power supplies are used depending on whether the telephone set is in a normal mode (a standby mode) or a power-saving mode (a sleep state). More specifically, a power supply used in the standby mode has a relatively high power capacity to generate a pseudo-CI signal, while a power supply used in the sleep state has a relatively low power capacity because it is sufficient to generate only an off-hook voltage and it is not necessary to generate a pseudo-CI signal. By switching the power supply which supplies power to the DC-DC converter and the ringing circuit such that the low-capacity power supply is selected in the sleep state, it is possible to detect an off-hook state of the telephone set even in the sleep state while achieving a reduction in consumption power. In the technique disclosed in Japanese Patent Laid-Open No. 2002-344566, the off-hook voltage is generated to detect an off-hook state of the telephone set, and a microprocessor unit (MPU) is supplied with power even in the sleep state such that the MPU is capable of controlling the operation of generating the off-hook voltage.

In the conventional technique described above, the power supply for supplying power to the DC-Dc converter and the ringing circuit is switched depending on whether the apparatus is in the standby mode or the sleep state thereby achieving a reduction in consumption power while keeping the supply of the off-hook voltage to the telephone set. However, no reduction is achieved in power consumed by the DC-DC converter and the ringing circuit. Typically, the power consumed by the DC-DC converter and the ringing circuit is about 2 W, which is consumed always even in the sleep state. Furthermore, in the conventional technique, to make it possible to perform an operation of setting or switching the DC-DC converter and the ringing circuit, the MPU responsible for controlling the system is maintained in the on-state. Therefore, in addition to the power consumption of about 2 W described above, power is also consumed by the MPU (for example, several W), which results in an increase in power consumption in the sleep state. This increase in power consumption makes it difficult to meet the above-described regulation in terms of the power consumption of electric devices.

SUMMARY OF THE INVENTION

The present disclosure provides a technique of handling the situation described above.

More specifically, the present disclosure provides a technique of further reducing power consumed by an image communication apparatus in the sleep state.

According to an aspect of the present invention, an image communication apparatus to communicate with a telephone set includes a first control unit configured to control the image communication apparatus, a detection unit configured to detect an occurrence of an off-hook state on the telephone set, a generation unit configured to generate a pseudo incoming call (pseudo-CI) signal for ringing the telephone set or an intermittent off-hook voltage to be supplied to the detection unit, a switching unit configured to switch a connection state between a state in which the telephone set is connected to a communication line and a state in which the telephone set is connected to the generation unit, and a second control unit configured to control the generation unit, wherein the first control unit is configured such that, in a case where the telephone set is controlled to wait for a call without being allowed to ring in a power-saving state, the first control unit controls the switching unit to connect the telephone set to the generation unit thereby causing the telephone set to be placed in the power-saving state, and wherein the second control unit is configured such that, in the power-saving state, the second control unit controls the generation unit to generate the intermittent off-hook voltage and supply the resultant intermittent off-hook voltage to the detection unit.

Further features of the present invention will become apparent from the following description of embodiments with reference to the attached drawings.

BRIEF DESCRIPTION OF THE DRAWINGS

Note that accompanying drawings are included in the specification as part of thereof to illustrate embodiments of the present disclosure and to illustrate principles of the present disclosure.

FIG. 9 is a flow chart illustrating an operation of the facsimile apparatus to exit the sleep state according to the second embodiment.

DESCRIPTION OF THE EMBODIMENTS

The present disclosure is described in further detail below with reference to embodiments in conjunction with the accompanying drawings. Note that these embodiments are described by way of example only and not limitation. Also note that all parts, elements, or steps described in embodiments are not necessarily needed to practice the disclosure.

First Embodiment

An image communication apparatus according to an embodiment of the present disclosure is described below for a case where the image communication apparatus is by way of example a facsimile apparatus. When the facsimile apparatus is set, for example, in a FAX/TEL mode, a telephone set connected to the facsimile apparatus is in a waiting state in which the telephone set is disconnected from a communication line. To make it possible to allow a user to use the telephone set even in the waiting state, it is necessary to supply an off-hook voltage to the telephone set to detect an off-hook state of the telephone set. When it is not necessary to ring the telephone in a pseudo manner, the off-hook voltage is generated by intermittently operating a direct current to direct current (DC-DC) converter in a pseudo-CI signal transmission circuit. In the present embodiment, in a case where the facsimile apparatus is in a sleep state (a power-saving state) in which the telephone set is in a waiting state without being allowed to ring, the telephone set is disconnected from the communication line, and an intermittent off-hook voltage is generated and supplied to the telephone set thereby further reducing consumption power in the sleep state.

Figure 1:
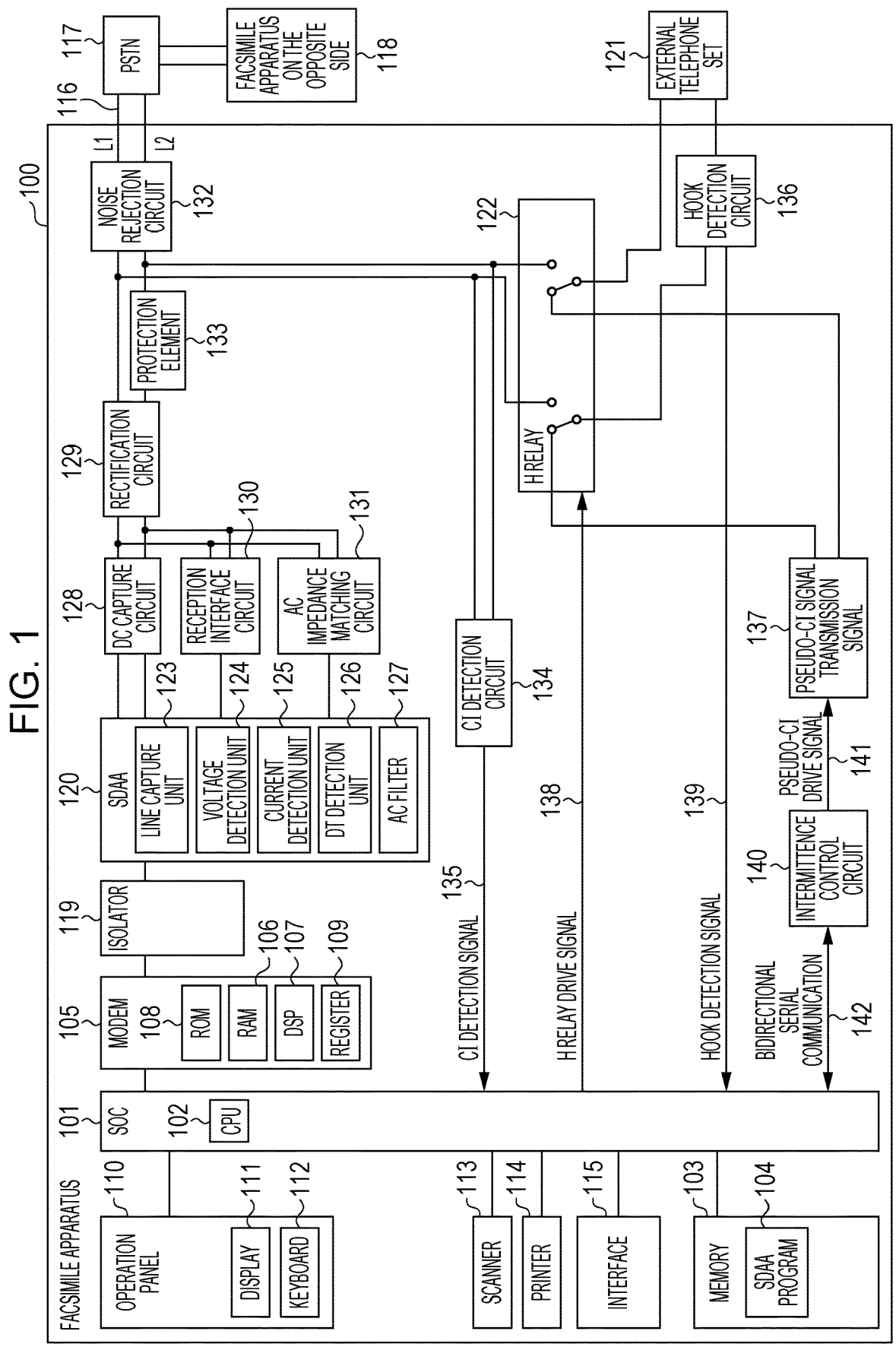
FIG. 1 is a block diagram illustrating a configuration of a facsimile apparatus according to a first embodiment of the present disclosure.

FIG. 1 is a block diagram illustrating a configuration of a facsimile apparatus 100 according to a first embodiment of the present disclosure.

A system on chip (SOC) 101 controls the whole facsimile apparatus 100. A central processing unit (CPU) 102 is implemented in the SOC 101 and serves to control an operation of the whole facsimile apparatus 100 by executing a program stored in a memory 103. The memory 103 connected to the SOC 101 functions as a main memory used as a work memory by the CPU 102 of the SOC 101. The memory 103 is also used to store a control program executed by the CPU 102. Furthermore, the memory 103 is also used to temporarily store image data or various kinds of information when facsimile transmission or facsimile reception is performed. The memory 103 is also used to store various kinds of information set by a user. A Silicon Data Access Arrangement (SDAA) program 104 is a program that is transferred to a modem 105, installed in a random-access memory (RAM) 106 of the modem 105, and executed by a DSP 107.

The SOC 101 is connected to an operation panel 110, a reading unit (scanner) 113, a recording unit (printer unit) 114, and an interface unit 115. The operation panel 110 includes a display 111 and a keyboard unit 112, which function as user interfaces. The display 111 displays a status of the facsimile apparatus and also displays a menu and the like. The keyboard unit 112 includes hardkeys such as button, a ten-key pad, and the like for accepting various commands from a user. A user is allowed to input various kinds of setting information and the like via the keyboard unit 112. The display 111 may have a touch panel function. In this case, the display 111 may provide part of the function of the keyboard unit 112. The reading unit 113 reads an image of a document and generates image data thereof. The resultant image data may be transmitted, as facsimile transmission, to a destination facsimile apparatus 118 via a communication line 116 and a public network (PSTN) 117, or may be printed by the recording unit 114. The interface unit 115 provides an interface in a connection to various external information devices.

The modem 105 is connected to the SOC 101 and functions as a modulator-and-demodulator unit that operates under the control of the SOC 101. The modem 105 performs a modulation process on to-be-transmitted image data obtained by reading a document by the reading unit 113 and also performs a demodulation process on a signal received via the communication line 116. The modem 105 is connected to an SDAA (silicon data access arrangement) 120 via an insulation device 119. The modem 105 includes a ROM 108 storing a program that is to be installed in the RAM 106 and executed by the DSP 107. The RAM 106 is used to install the SDDA program 104 and the program stored in the ROM 108 such that they are allowed to be executed by the DSP 107. The DSP 107 controls the operation of the modem 105 by executing the program installed in the RAM 106. A register 109 stores data indicating the status of the SDAA 120 and also stores an instruction issued by the SOC 101.

The SDAA 120 is an example of a network control unit and may be a semiconductor NCU (network control unit). The SDAA 120 is connected to the communication line 116 and functions as an interface between the facsimile apparatus 100 and an external public network 117. When a communication with an apparatus on an opposite side via the communication line 116 is performed, the SDAA 120 controls a connection (capture) state of the line. The telephone set 121 externally connected to the facsimile apparatus 100 is connected to the communication line 116 via a H relay 122. The SDAA 120 is connected, in parallel with the telephone set 121, to the communication line 116. The SDAA 120 captures the line and controls the communication, not only when a facsimile transmission/reception operation is performed, but also when the telephone set 121 performs voice communication with an apparatus at an opposite end via the communication line 116. The SDAA 120 controls the operations described above under the control of the SOC 101.

The SDAA 120 controls the DC capture state of the line using a line capture unit 123. In a case where DC is captured by the line capture unit 123, the DC impedance is variable. The impedance is obtained by controlling a predetermined DC voltage-current characteristic (hereinafter referred to as a DC-VI characteristic). The voltage detection unit 124 monitors a voltage on the line. The current detection unit 125 monitors a current on the line. The DT detection unit 126 monitors a dial tone signal on the line. The AC filter unit 127 is disposed on an input-side of the voltage detection unit 124 or the current detection unit 125 such that a detection error due to an AC component is prevented when the voltage detection unit 124 or the current detection unit 125 detects a DC voltage or a DC current.

The DC capture circuit 128 is a peripheral circuit of the SDAA 120 and is configured using a current source realized by a transistor or the like. The DC capture circuit 128 adjust the current of the current source while capturing the DC component thereby adjusts the DC impedance under the control of the SDAA 120. The DC capture circuit 128 is also used to make a line-open state or transmit a dial pulse which is a kind of a line selection signal. The rectification circuit 129 includes a diode bride circuit or the like thereby rectifying a signal from the communication line 116. The resultant rectified signal is supplied to the SDAA 120. The reception interface circuit 130 is an interface circuit for receiving a signal such as a facsimile signal via the communication line 116. The AC impedance matching circuit 131 is a circuit for achieving AC impedance (for example, 600 ohms in Japan) during communication. The noise rejection circuit 132 is a circuit for suppressing a lightning surge, electromagnetic noise, or the like from the communication line 116 and also preventing noise from being transmitted from the facsimile apparatus 100 to the communication line 116. A protection element 133 is an overcurrent protection element realized using, for example, a fuse.

The CI detection circuit 134 is connected to the communication line 116 and serves to detect an incoming call signal (hereinafter referred to as a CI signal) received via the communication line 116. When the CI detection circuit 134 detects a CI signal from the communication line 116, the CI detection circuit 134 transmits a CI detection signal 135 indicating the detection of the CI signal to the SOC 101. Based on this CI detection signal 135, the SOC 101 determines whether a CI signal has arrived from the communication line 116.

The H relay 122 is a circuit for connecting the external telephone set 121, via the hook detection circuit 136, to the pseudo-CI signal transmission circuit 137 or the communication line 116. The H relay 122 switches the connection state between a state in which the external telephone set 121 is connected to the communication line 116 and a state in which the external telephone set 121 is disconnected from the communication line 116. The H relay 122 switches the connection state according to a H relay driving signal 138 supplied from the SOC 101. Note that in the state where the telephone set 121 is disconnected from the communication line 116 by the H relay 122 as shown in FIG. 1, the telephone set 121 does not ring even when a CI signal arrives. When the telephone set 121 is in this state, it is said that the facsimile apparatus 100 is in an incoming call reception mode with no ringing.

The hook detection circuit 136 is connected to the telephone set 121 and serves to detect when the telephone set 121 goes off-hook or on-hook. The hook detection circuit 136 transmits an off-hook detection signal 139 to the SOC 101 to notify of a result of the detection on the off-hook or on-hook state of the telephone set 121. Based on this off-hook detection signal 139, the SOC 101 determines the hook status of the telephone set 121. In both states, that is, in the state in which the telephone set 121 is connected to the communication line 116 via the H relay 122 and the state in which the telephone set 121 is connected to the pseudo-CI signal transmission circuit 137, the hook detection circuit 136 detects a current flowing through the telephone set 121. Thus, the hook detection circuit 136 is capable of detecting an off-hook state or an on-hook state of the telephone set 121.

The pseudo-CI signal transmission circuit 137 sends a pseudo-CI signal to the telephone set 121. This pseudo-CI signal is a signal which is sent to the telephone set 121 when a CI call from an apparatus at an apparatus at an opposite end arrives via the communication line 116 to ring the telephone set 121 in the state being disconnected from the line. In the incoming call reception mode with no ringing, the pseudo-CI signal transmission circuit 137 does not need to transmit a pseudo-CI signal. Therefore, in this state, the pseudo-CI signal transmission circuit 137 functions as a power supply that outputs an intermittent off-hook voltage to the hook detection circuit 136 to make it possible to detect an occurrence of an off-hook or on-hook state in the telephone set 121. Depending on the operation mode of the facsimile apparatus 100, the SOC 101 selects whether the pseudo-CI signal or the intermittent off-hook voltage is generated by the pseudo-CI signal transmission circuit 137.

The intermittent operation control circuit 140 sends a pseudo-CI driving signal 141 for driving the pseudo-CI signal transmission circuit 137. In a case where a pseudo-CI signal is generated, serial communication 142 is performed between the SOC 101 and the intermittent operation control circuit 140 such that the pseudo-CI driving signal 141 is sent to the pseudo-CI signal transmission circuit 137 by the SOC 101 via the intermittent operation control circuit 140. In response, the pseudo-CI signal transmission circuit 137 sends a pseudo-CI signal to the telephone set 121. On the other hand, in a case where an intermittent off-hook voltage is generated and supplied to the hook detection circuit 136, the control of the pseudo-CI driving signal 141 is transferred from the SOC 101 to the intermittent operation control circuit 140 such that the intermittent operation control circuit 140 controls the transmission of the pseudo-CI driving signal 141. As a result, the SOC 101 goes to a sleep state. After the SOC 101 goes to a sleep state, the intermittent operation control circuit 140 sends, to the hook detection circuit 136, an intermittent off-hook voltage having a waveform in which turning-on and turning-off are repeated.

Figure 2:
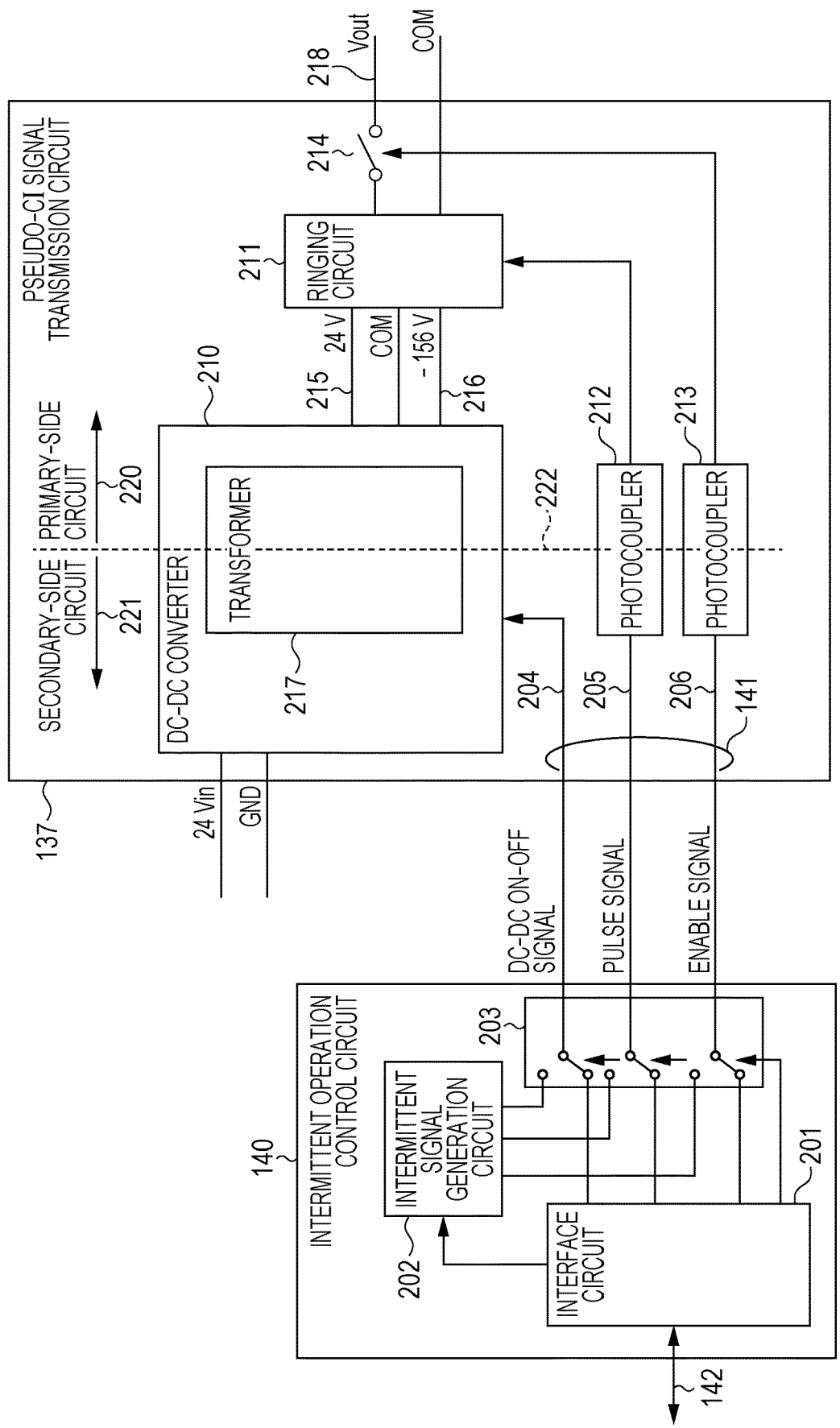
FIG. 2 is a block diagram illustrating an operation of an intermittent operation control circuit and a pseudo-CI signal transmission circuit of a facsimile apparatus according to the first embodiment.

FIG. 2 is a block diagram illustrating an operation of the intermittent operation control circuit 140 and the pseudo-CI signal transmission circuit 137 of the facsimile apparatus 100 according to the first embodiment.

The intermittent operation control circuit 140 includes an interface circuit 201, an intermittent signal generation circuit 202, and a change-over switch 203, and serves to output a pseudo-CI driving signal 141 to control the pseudo-CI signal transmission circuit 137. The pseudo-CI driving signal 141 includes a DC-DC on-off signal 204, a pulse signal 205, and an enable signal 206.

The interface circuit 201 is a circuit, such as a SPI (serial peripheral interface) or the like, that provides an interface in bidirectional serial communication 142 between the intermittent operation control circuit 140 and the SOC 101. The intermittent signal generation circuit 202 is a circuit configured to generate a control signal (a DC-DC on-off signal) for controlling the pseudo-CI signal transmission circuit 137 to output the intermittent off-hook voltage.

The change-over switch 203 switches a connection between a state in which the pseudo-CI driving signal 141 for controlling the pseudo-CI signal transmission circuit 137 is supplied from the intermittent signal generation circuit 202 and a state in which the pseudo-CI driving signal 141 is supplied from the SOC 101 via the interface circuit 201. The switching operation of the change-over switch 203 is controlled by the SOC 101 via the interface circuit 201.

The pseudo-CI signal transmission circuit 137 includes a DC-DC converter 210, a ringing circuit 211, photocouplers 212 and 213, and a switch 214, and serves to output the pseudo-CI signal or the intermittent off-hook voltage in accordance with the pseudo-CI driving signal 141 output from the intermittent operation control circuit 140. The DC-DC converter 210 generates a voltage 215 of 24 V and a voltage 216 of −156 V from an input voltage 24Vin. The DC-DC converter 210 performs the DC-DC conversion operation and stops the operation in accordance with the DC-DC on-off signal 204. Note that the voltage 215 of 24 V and the voltage 216 of −156 V are isolated from the input voltage 24Vin by a transformer 217.

The ringing circuit 211 switches the voltage supplied from the DC-DC converter 210, in accordance with the on/off transition of the pulse signal 205, between the voltage 215 of 24 V and the voltage 216 of −156 V such that the selected voltage is output to the telephone set 121. Note that the pulse signal 205 is isolated via the photocoupler 212, and the output of the ringing circuit 211 is switched by this isolated signal. The switch 214 switches the state, in accordance with the enable signal 206 isolated via the photocoupler 213, between a state in which the ringing circuit 211 is allowed to output Vout 218 and a state in which the ringing circuit 211 is not allowed to output Vout 218.

When the pseudo-CI signal is generated, the SOC 101 controls the switch 203 so as to connect to the interface circuit 201 and the SOC 101 directly controls the pseudo-CI signal transmission circuit 137. That is, the SOC 101 turns on the DC-DC on-off signal 204 for operating the DC-DC converter 210 via the interface circuit 201. The SOC 101 controls the switching between the voltage 215 of 24 V and the voltage 216 of −156 V, and supplies the pulse signal 205 for generating the pseudo-CI signal to the ringing circuit 211. The pseudo-CI signal generated by the ringing circuit 211 is allowed, when the enable signal 206 is at the on-level, to be output as Vout 218 via the switch 214. In response to receiving this pseudo-CI signal, the telephone set 121 rings to notify that an incoming call occurs.

Note that in the pseudo-CI signal transmission circuit 137, a primary-side circuit 220 on the input side and a secondary-side circuit 221 on the output side are electrically isolated from each other at boundary line 222 by the transformer 217 and the photocouplers 212 and 213. This is to achieve safety, that is, to prevent a high voltage such as −156 V generated by the DC-DC converter 210 or induced lightning intruding from the outside via a telephone line or the like from entering the secondary-side circuit 221 from the primary-side circuit 220 thereby protecting a user, who may touch the secondary-side circuit 221, from the high voltage.

Figure 3:
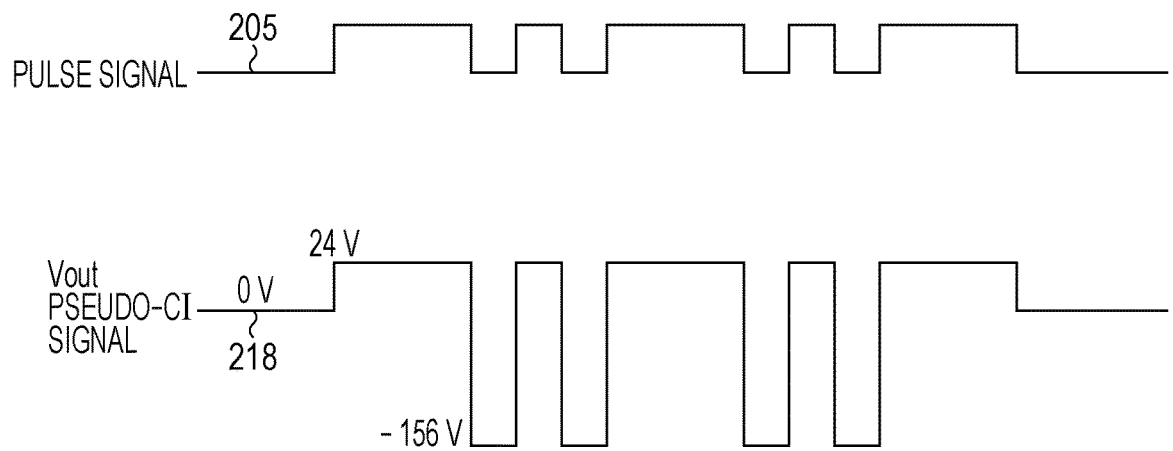
FIG. 3 is a timing chart illustrating examples of waveforms of a pulse signal output from the intermittent operation control circuit and a pseudo-CI signal output from the pseudo-CI signal transmission circuit according to the first embodiment.

FIG. 3 is a timing chart illustrating examples of waveforms of a pulse signal 205 output from the intermittent operation control circuit 140 and a pseudo-CI signal output from the pseudo-CI signal transmission circuit 137 according to the first embodiment.

In this example, the pulse signal 205 is supplied to the pseudo-CI signal transmission circuit 137 thereby switching the voltage generated by the DC-DC converter 210 between the voltage 215 of 24 V and the voltage 216 of −156 V. As a result, Vout 218 (the pseudo-CI signal) is generated. More specifically, when the pulse signal 205 is at the on-level, the voltage 215 of 24 V is output, while the voltage 216 of −156 V is output when the pulse signal 205 is at the off-level. When the pseudo-CI signal is generated in the above-described manner, the telephone set 121 rings in response to the pseudo-CI signal.

Figure 4:
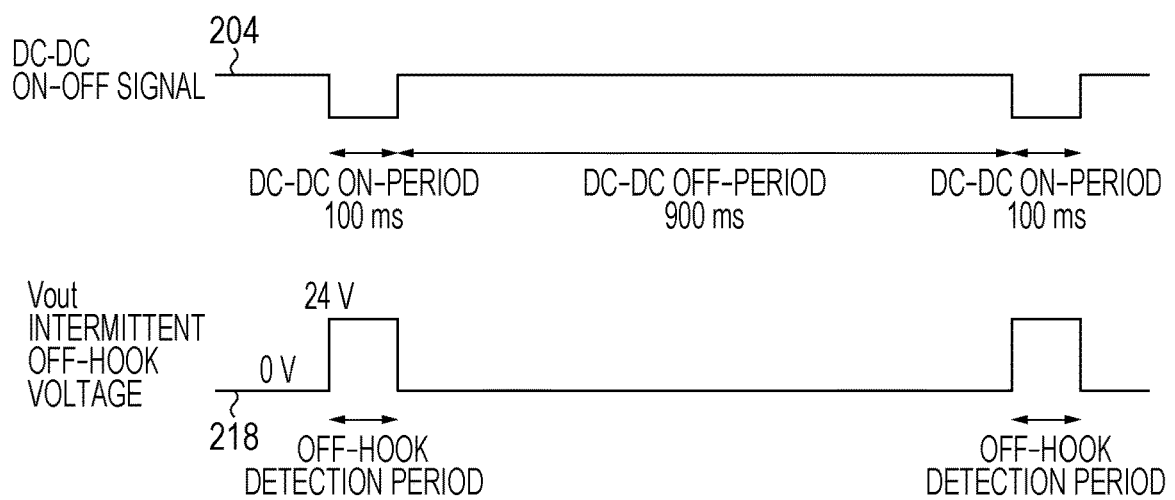
FIG. 4 is a timing chart associated with a DC-DC on-off signal and an intermittent off-hook voltage output from the intermittent operation control circuit according to the first embodiment.

FIG. 4 is a timing chart associated with the DC-DC on-off signal 204 and the intermittent off-hook voltage output from the intermittent operation control circuit 140 according to the first embodiment.

When the intermittent off-hook voltage is generated, the SOC 101 controls the switch 203 to connect to the intermittent signal generation circuit 202 and controls the pseudo-CI signal transmission circuit 137. That is, using the intermittent signal generation circuit 202, the DC-DC converter 210 is controlled to repeatedly be turned on and off in accordance with the DC-DC on-off signal 204. In this case, the pseudo-CI signal is not generated. Therefore, the pulse signal 205 is fixed such that only the voltage 215 of 24 V is output. Furthermore, the enable signal 206 is set to the on-level thereby turning on the switch 214 such that the intermittent off-hook voltage is output from the pseudo-CI signal transmission circuit 137 as Vout 218 to the hook detection circuit 136.

The DC-DC on-off signal 204 is a signal, for example, having a 100-ms on-period and a 900-ms off-period which are repeated periodically. Only during each the 100-ms on-period, the DC-DC converter 210 is operated, while the DC-DC converter 210 is stopped during each 900-ms off-period. Thus, Vout 218 output from the pseudo-CI signal transmission circuit 137 has an intermittent off-hook voltage output as the voltage 215 of 24 V only during each 100-ms on-period. During each period in which the voltage 215 of 24 V is output, the hook detection circuit 136 is allowed to detect an off-hook state of the telephone set 121.

In the DC-DC on-off signal 204, the greater the ratio of the off-period to the on-period, the greater the ratio of the off-state period of the DC-DC converter 210 to the on-state period and thus a greater reduction in power consumption is achieved. In the present example, the on-period has a length of 100 millisecond (ms), and the off-period has a length of 900 ms, and thus the duty factor is ⅒. However, the present disclosure is not limited to this example, but the periods may be set to any proper values. Note that a change in the on-period or the off-period may cause a change in a response time of detecting an off-hook state of the external telephone device 121 and may cause a change in amount of reduction in power consumption, and thus it may be desirable to determine the values of the periods taking into account the factors described above. For example, in a case where the duty factor is set to 1/7.5, the power consumed by the pseudo-CI signal transmission circuit 137 decreases from 1.8 W (24 V×75 mA) to 0.24 W (24 V×10 mA).

Figure 5:
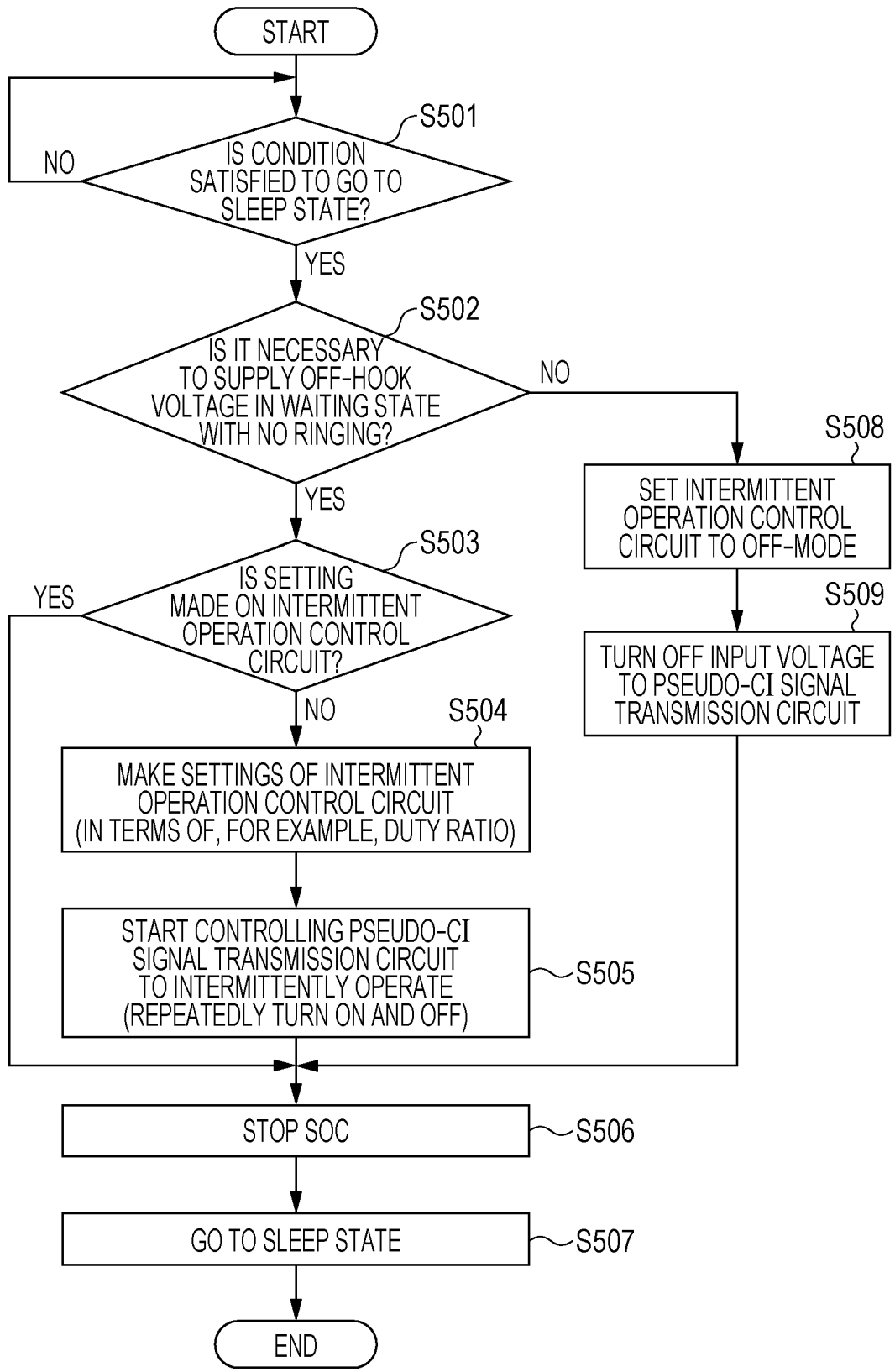
FIG. 5 is a flow chart illustrating an operation of the facsimile apparatus to go to a sleep state according to the first embodiment.

FIG. 5 is a flow chart illustrating an operation of the facsimile apparatus 100 to go to a sleep state according to the first embodiment of the present disclosure. A program for performing this process is stored in the memory 103, and the CPU 102 executes this program thereby achieving the process shown in the flow chart shown in FIG. 5.

First, in S501, the CPU 102 determines whether a transition condition set in advance in the facsimile apparatus 100 is satisfied for facsimile apparatus 100 to go to a sleep state. In a case where the CPU 102 determines in S501 that this transition condition is satisfied, the CPU 102 proceeds to S502. In S502, the CPU 102 determines whether it is necessary to supply an off-hook voltage to the telephone set 121 in a state in which the telephone set 121 waits for an incoming call without ringing.

According to the first embodiment, the facsimile apparatus 100 has functions of, for example, receiving an incoming call, remote reception, FAX/TEL switching, manual reception, automatic reception without ringing, and the like. In a case where one of these functions is set, when the facsimile apparatus 100 is in the sleep state, the telephone set 121 is set in the waiting mode with no ringing. This is because if the telephone set 121 is set in a waiting state in which ringing is allowed, when an incoming call occurs, an operation of exiting the sleep state is started and at the same time the telephone set 121 starts to ring. This may cause a user to perform a hook-up operation before exiting the sleep state is complete. If a user performs a hook-up operation before the SOC 101 providing a function goes to a standby state, the SOC 101 cannot recognize what is performed by the user, and thus the SOC 101 cannot execute the function. To avoid the situation described above, when one of the functions described above is set, the telephone set 121 is set in the waiting state without being allowed to ring.

In a case where the CPU 102 determines in S502 that it is necessary to supply the off-hook voltage to the hook detection circuit 136 to allow the telephone set 121 to wait for an incoming call in a no-ringing mode, the CPU 102 advances the process to S503, but otherwise the CPU 102 advances the process to S508. In S503, the CPU 102 determines whether setting has already been performed on the intermittent operation control circuit 140. This determination is performed for the following reason. When setting has already been performed on the intermittent operation control circuit 140, it is possible to supply the intermittent off-hook voltage to allow the telephone set 121 to be in the waiting state without ringing even in the standby state. In a case where it is determined in S503 that setting of the intermittent operation control circuit 140 has not yet been performed, the CPU 102 proceeds to S504, but otherwise the CPU 102 proceeds to S506.

In S504, the CPU 102 performs various settings necessary for performing an intermittent operation of the off-hook voltage. For example, the duty factor of the intermittent operation is set in the intermittent operation control circuit 140. Next, in S505, the CPU 102 outputs a pseudo-CI driving signal 141 via the intermittent operation control circuit 140 thereby driving the pseudo-CI signal transmission circuit 137 to make the intermittent operation control circuit 140 start outputting the intermittent off-hook voltage. Thereafter, the CPU 102 proceeds to S506.

On the other hand, in a case where it is determined in S502 that it is not necessary to supply an off-hook voltage to the hook detection circuit 136 in order to make the telephone set 121 be in a waiting state without ringing, CPU 102 proceeds to S508 in which the CPU 102 sets the operation of the intermittent operation control circuit 140 to turn off. Thereafter, the CPU 102 proceeds to S509 in which the CPU 102 turns off the input power supply of the pseudo-CI signal transmission circuit 137. Thereafter, the CPU 102 proceeds to S506. This is because in the case where it is determined in S502 that the telephone set 121 is in the waiting state without ringing, the telephone set 121 is connected to the communication line 116 via the H relay 122, and thus it is not necessary to supply the intermittent off-hook voltage to the telephone set 121 when the facsimile apparatus 100 is in the sleep state. As described above, in S508, a shut-down sequence or the like is performed for preparation for turning off the input voltage applied to the pseudo-CI signal transmission circuit 137, and then in S509 the input power supplied to the pseudo-CI signal transmission circuit 137 is turned off.

In S506, the CPU 102 stops the operation of the SOC 101. Next, in S507, the CPU 102 makes the facsimile apparatus 100 go to the sleep state. In this case, the SOC 101 has made, in S504 and S505, various settings necessary for the pseudo-CI signal transmission circuit 137 to perform the intermittent operation. Therefore, in the following process, in a case where the telephone set 121 is in the waiting state without ringing, the intermittent operation described above is continued by the pseudo-CI driving signal 141 transmitted by the intermittent operation control circuit 140. Therefore, as long as the intermittent operation is continued in the sleep state, the SOC 101 does not need to be involved in the intermittent operation, and thus, when the facsimile apparatus 100 goes to the sleep state, it is allowed to turn off the power supply to the SOC 101 thereby turning the SOC 101 into the sleep state.

After the telephone set 121 gets into the no-ringing waiting state via the process described above, the intermittent off-hook voltage is supplied to the hook detection circuit 136 under the control of the intermittent operation control circuit 140 while maintaining the SOC 101 in the state in which no power is supplied to the SOC 101. This makes it possible for the telephone set 121 to be in the waiting state without ringing while reducing the power consumption in the sleep state.

Figure 6:
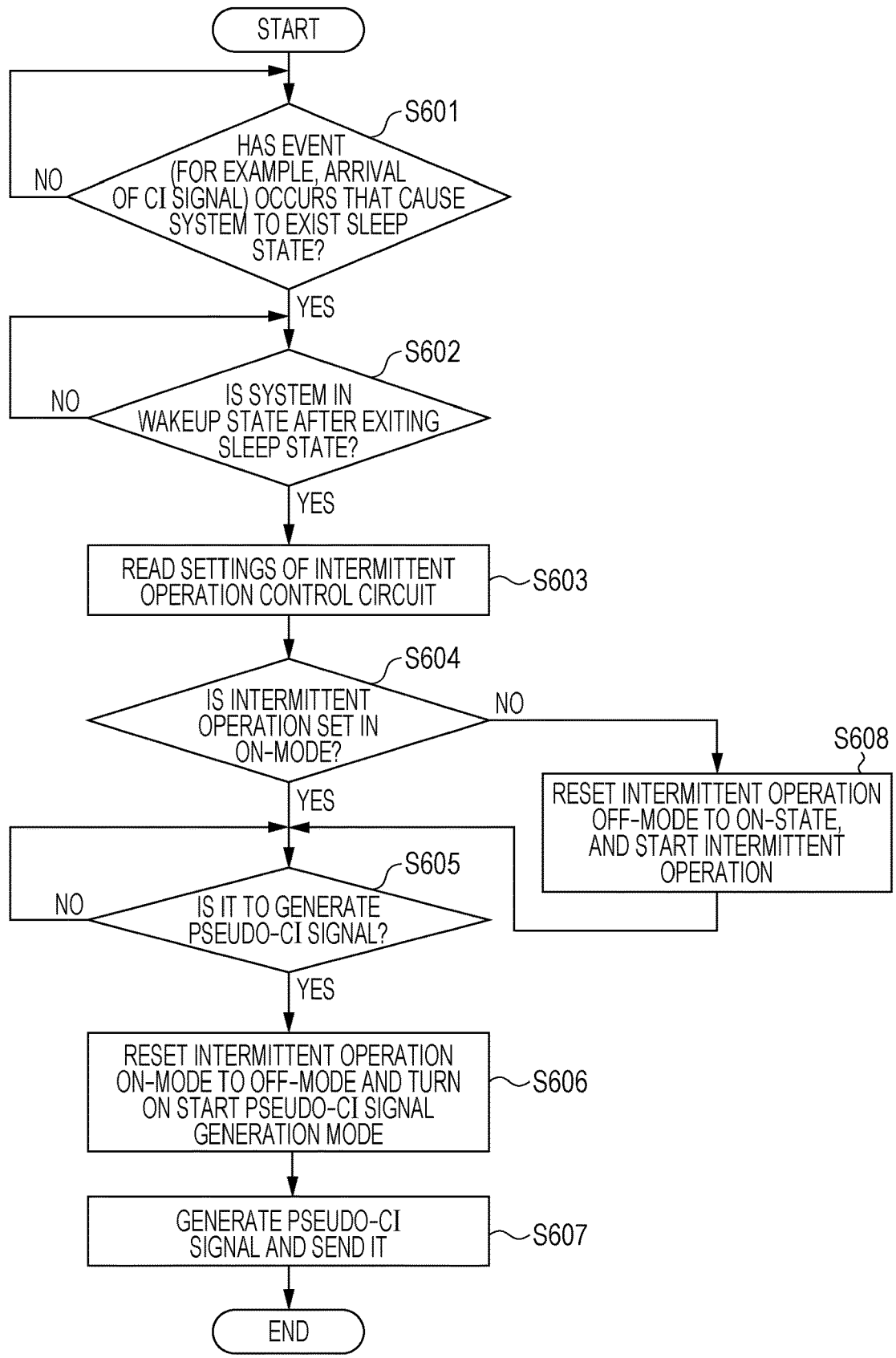
FIG. 6 is a flow chat illustrating an operation of the facsimile apparatus to exit the sleep state according to the first embodiment of the present disclosure.

FIG. 6 is a flow chat illustrating an operation of the facsimile apparatus 100 to exit the sleep state according to the first embodiment of the present disclosure. A program for performing this process is stored in the memory 103, and the CPU 102 executes this program thereby achieving the process shown in the flow chart shown in FIG. 6.

First, in S601, the CPU 102 determines whether a condition has occurred to cause the facsimile apparatus 100 to exit the sleep state. Examples of such conditions include an occurrence of an operation on the operation panel 110 of the facsimile apparatus 100, an occurrence of a hook-up operation on the external telephone device 121, an occurrence of a CI arrival from a different apparatus via the communication line 116, and the like. For example, in a case where a CI arrives from some different apparatus via the communication line 116, the CI detection signal 135 is supplied from the CI detection circuit 134 to the SOC 101, and the CPU 102 determines that a condition to exit the sleep state has occurred. In a case where it is determined in S601 that a condition to exit the sleep state has occurred, the CPU 102 proceeds to S602 in which the CPU 102 makes the facsimile apparatus 100 exit the sleep state by a wake-up interrupt signal and determines whether the facsimile apparatus 100 has reached a standby state. In a case where it is determined that the standby state has been reached, the CPU 101 proceeds to S603 in which the CPU 102 reads setting of the intermittent operation control circuit 140 via bidirectional serial communication 142 such as SPI or the like. Thereafter, the CPU 101 proceeds to S604.

In S604, the CPU 102 determines whether the intermittent operation control circuit 140 is set to operate in an intermittent operation mode. In a case where it is determined that the intermittent operation mode is set, the CPU 102 proceeds to S605. However, in a case where it is determined that the intermittent operation mode is not set, the CPU 102 proceeds to S608, in which the CPU 102 performs an operation to turn off the pseudo-CI signal transmission circuit 137. Thereafter, the CPU 102 proceeds to S605. In the process in S608, the setting performed in S508 and S509 described above with reference to FIG. 5 is cancelled, and the intermittent operation mode is set. Thereafter, the CPU 102 proceeds to S605. That is, in a case where the input power to the pseudo-CI signal transmission circuit 137 is turned off in S508 and S509 in the sleep state, the input power is turned on to make it possible to generate a pseudo-CI signal after the sleep state is exited, and the intermittent operation mode is started. Note that in the standby after the sleep state is exited, the intermittent operation may be or may not be performed. However, to achieve a reduction in power consumption, it is desirable to perform the intermittent operation even in the standby state.

In S605, the CPU 102 determines whether to generate the pseudo-CI signal. In a case where the answer to S605 is YES, that is, in a case where the pseudo-CI signal is generated to make the telephone set 121 ring, the CPU 102 proceeds to S606. In S606, the CPU 102 cancels the intermittent operation mode, and switches the mode such that the SOC 101 is allowed to directly control the pseudo-CI signal transmission circuit 137. The CPU 102 then proceeds to S607 in which the CPU 102 outputs the pulse signal 205 to the pseudo-CI signal transmission circuit 137 thereby controlling the pseudo-CI signal transmission circuit 137 to generate the pseudo-CI signal and transmit it to the telephone set 121 to make the telephone set 121 ring.

In the process described above, the intermittent operation control circuit 140 functions as a bypass circuit such that the SOC 101 controls the pseudo-CI signal transmission circuit 137 to generate the pseudo-CI signal. On the other hand, in a case where the intermittent signal generation circuit 202 controls the pseudo-CI signal transmission circuit 137 to generate the intermittent off-hook voltage, the SOC 101 sets the intermittent operation control circuit 140 such that the off-hook voltage is controlled by the pseudo-CI driving signal generated by the intermittent signal generation circuit 202. In this state, the intermittent signal generation circuit 202 generates a repetition of the DC-DC on-off signal 204. The intermittent signal generation circuit 202 can be realized using a logic circuit such as a counter circuit, a timer circuit, or the like. The configuration of the intermittent operation control circuit 140 is not limited to the example described above. For example, the intermittent operation control circuit 140 may be realized using a sub-CPU which may consume lower power than the power consumed by the SOC 101.

According to the first embodiment, as described above, in a case where the connected external telephone set is set in the waiting state in which ringing is not allowed when the facsimile apparatus is in the sleep state, it is possible to supply, using the circuit, the intermittent off-hook voltage to the hook detection circuit without the CPU having to control the operation. Thus, even in the sleep state, it is possible to detect an occurrence of an off-hook state on the telephone set, which allows a further reduction in power consumption during the sleep state. By changing the duty factor of the intermittent off-hook voltage such that the on-ratio is reduced, it is possible to further reduce the power consumption during the operation in the state in which the telephone set waits for an incoming call without ringing.

Second Embodiment

Next, a second embodiment of the present disclosure is described below. In the second embodiment, the intermittent off-hook voltage is output to the telephone set 121 without generating the pseudo-CI signal described above. Note that in the second embodiment, the configuration of the facsimile apparatus 100 is different from that according to the first embodiment in that the intermittent operation control circuit 140 and the pseudo-CI signal transmission circuit 137 in the first embodiment are respectively replaced by an intermittent operation control circuit 700 and a DC power supply circuit 710 in the second embodiment. The other elements in the configuration of the facsimile apparatus 100 are the same as those in the first embodiment, wherein other elements are not shown.

Figure 7:
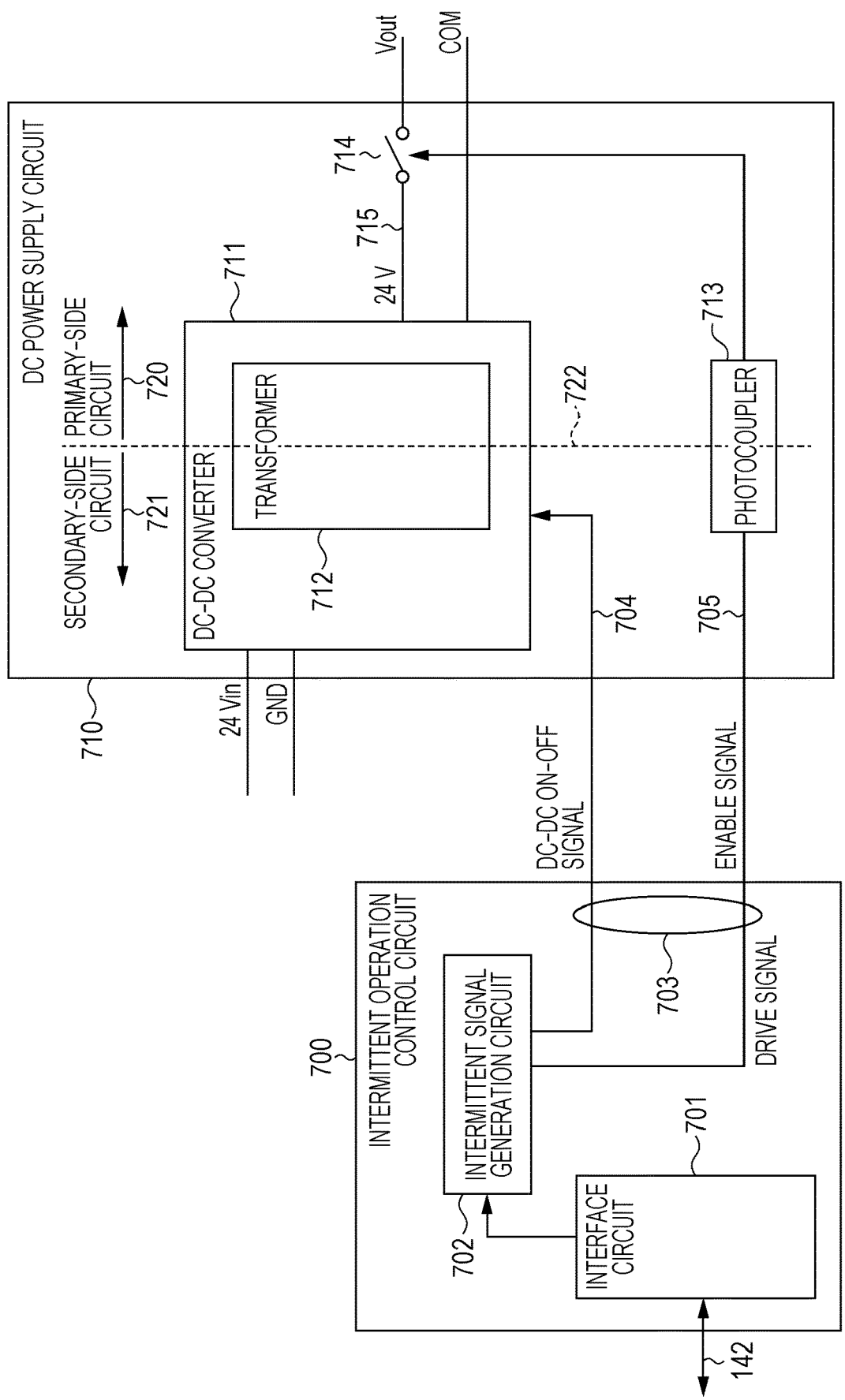
FIG. 7 is a block diagram illustrating a configuration of an intermittent operation control circuit and a DC power supply circuit of a facsimile apparatus according to a second embodiment of the present disclosure.

FIG. 7 is a block diagram illustrating a configuration of the intermittent operation control circuit 700 and the DC power supply circuit 710 of the facsimile apparatus 100 according to the second embodiment of the present disclosure.

In the second embodiment, instead of the intermittent operation control circuit 140 and the pseudo-CI signal transmission circuit 137 described above with reference to FIG. 2, the intermittent operation control circuit 700 and the DC power supply circuit 710 are used. The DC power supply circuit 710 is a circuit configured to generate an intermittent off-hook voltage for detecting an off-hook state of the telephone set 121, and the DC power supply circuit 710 does not have a function of generating the pseudo-CI signal described above with reference to FIG. 2. The other elements are similar to those shown in the block diagram of FIG. 1.

The intermittent operation control circuit 700 includes an interface circuit 701 and an intermittent signal generation circuit 702 and serves to generate a DC-DC on-off signal 704 and an enable signal 705 as a drive signal 703 for controlling the DC power supply circuit 710. The interface circuit 701 is a circuit, such as a SPI (serial peripheral interface) or the like, that provides an interface for bidirectional serial communication 142 between the intermittent operation control circuit 700 and the SOC 101. The intermittent signal generation circuit 702 generates the drive signal 703 for driving the DC power supply circuit 710 to perform an intermittent operation.

Next, a configuration of the DC power supply circuit 710 is described below.

The DC-DC converter 711 is a circuit configured to generate a voltage 715 of 24 V from an input voltage 24Vin. The DC-DC conversion operation can be stopped by the DC-DC on-off signal 704. The voltage 715 of 24 V is electrically isolated from the input voltage 24Vin by a transformer 712. The on/off state of the switch 714 is controlled by the enable signal 705 which is electrically isolated by a photocoupler 713 thereby controlling whether the output from the DC-DC converter 711 is output from the DC power supply circuit 710. When the intermittent off-hook voltage is generated, the intermittent signal generation circuit 702 generates the DC-DC on-off signal 704 thereby controlling the DC-DC converter 711 to repeatedly turn on and off. In this control process, the enable signal 705 is set to the on-level thereby turning on the switch 714, which allows the intermittent off-hook voltage to be output as Vout 716 from the DC power supply circuit 710.

Note that the signal waveforms of the DC-DC on-off signal 704 and the intermittent off-hook voltage are similar to those described above with reference to the timing chart shown in FIG. 4 in the first embodiment.

Note that a primary-side circuit 720 and a secondary-side circuit 721 are electrically isolated from each other at boundary line 722 by the transformer 712 and the photocoupler 713. This is to achieve safety, that is, to prevent an induced lightning intruding from the outside via a telephone line or the like from entering the secondary-side circuit 721 from the primary-side circuit 720 thereby protecting a user, who may touch the secondary-side circuit 721, from the high voltage.

In this configuration, the intermittent operation control circuit 700 controls the DC power supply circuit 710 to generate the intermittent off-hook voltage. In this control process, first, the SOC 101 sets up the intermittent operation control circuit 700 via the interface circuit 701 and commands the intermittent signal generation circuit 702 to start to operate. In the following continuous operation, the DC power supply circuit 710 is controlled by the drive signal 703 generated by the intermittent signal generation circuit 702 so as to generate the intermittent off-hook voltage.

In the process described above, the intermittent signal generation circuit 702 generates a repetition of the DC-DC on-off signal 704. This intermittent signal generation circuit 702 can be realized using a logic circuit such as a counter circuit, a timer circuit, or the like. The configuration of the intermittent operation control circuit 700 is not limited to the example described above. For example, the intermittent operation control circuit 700 may be realized using a sub-CPU which may consume lower power than the power consumed by the SOC 101.

Figure 8:
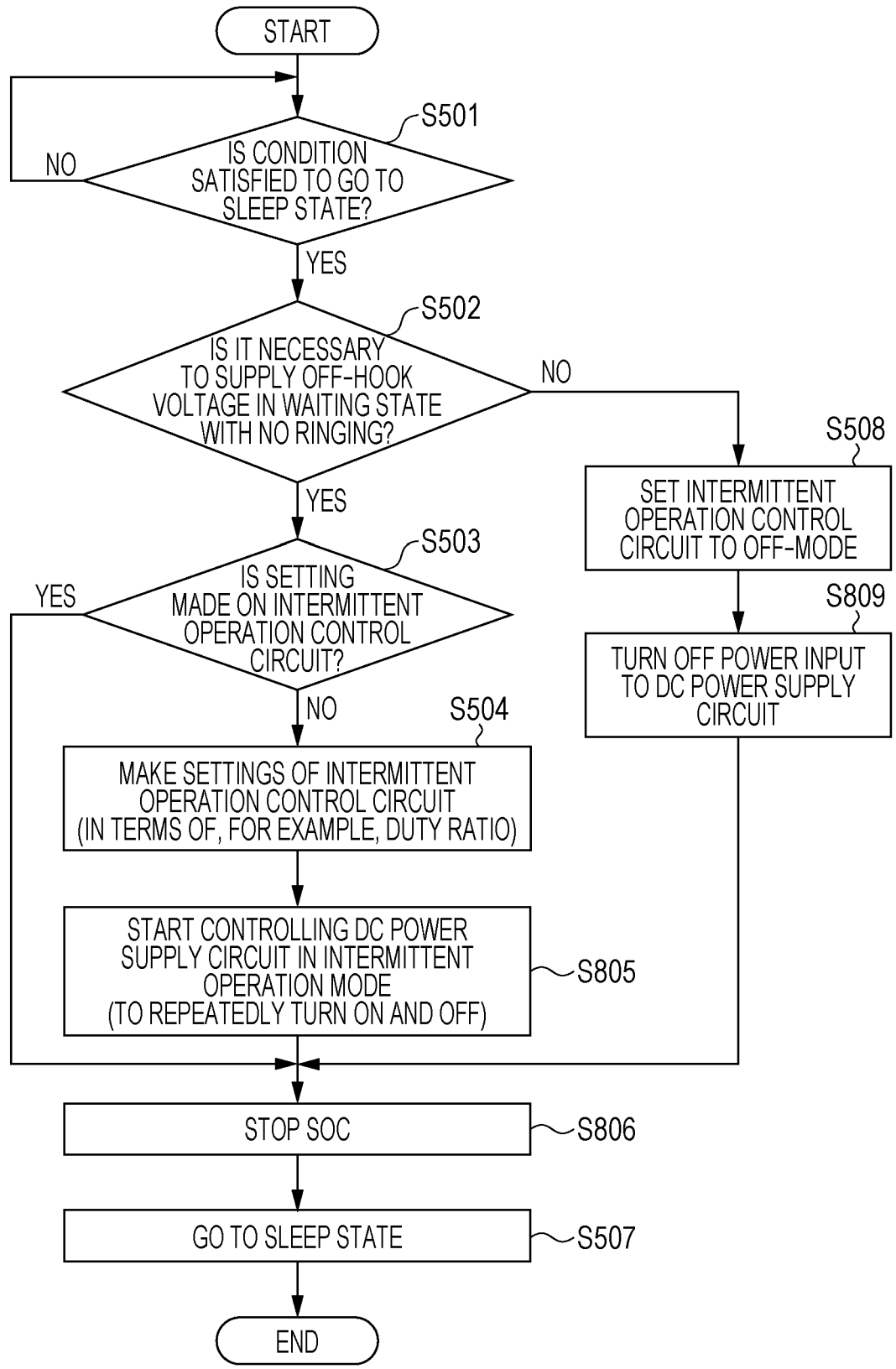
FIG. 8 is a flow chart illustrating an operation of the facsimile apparatus to go to a sleep state according to the second embodiment of the present disclosure.

FIG. 8 is a flow chart illustrating an operation of the facsimile apparatus 100 to turn to a sleep state according to the second embodiment of the present disclosure. A program for performing this process is stored in the memory 103, and the CPU 102 executes this program thereby achieving the process shown in the flow chart shown in FIG. 8. Note that in FIG. 8, steps similar to those shown in FIG. 5 are denoted by similar step numbers, and a further detailed description thereof is omitted.

In S805, the CPU 102 controls the intermittent signal generation circuit 702 to output the drive signal 703 thereby controlling the DC power supply circuit 710 to start outputting the intermittent off-hook voltage. The CPU 102 then proceeds to S806 in which the CPU 102 goes to a sleep state.

In a case where it is determined in S502 that it is not necessary to supply the off-hook voltage in order to make the telephone set 121 be in the waiting state in which ringing is not allowed, the CPU 102 proceeds to S508 in which the CPU 102 sets the intermittent operation control circuit 700 so as to turn off. The CPU 102 then proceeds to S809. In S809, the CPU 102 turns off the input power supplied to the DC power supply circuit 710 and proceeds to S806. That is, in the case where it is determined in S502 that the telephone set 121 is in the waiting state in which ringing is allowed, the telephone set 121 is connected to the communication line 116, and thus it is not necessary to supply the intermittent off-hook voltage to the telephone set 121 during the sleep state. Therefore, a shut-down sequence or the like is performed in S508 for preparation for turning off the input power supplied to the DC power supply circuit 710, and then in S809 the input power supplied to the DC power supply circuit 710 is turned off.

In S806, the CPU 102 stops the operation of the SOC 101 and proceeds to S507, in which the CPU 102 makes the facsimile apparatus 100 go to the sleep state.

After the telephone set 121 gets into the no-ringing waiting state via the process described above, the intermittent off-hook voltage is supplied to the hook detection circuit 136 under the control of the intermittent operation control circuit 140 while maintaining the SOC 101 in the state in which no power is supplied to the SOC 101. This makes it possible for the telephone set 121 to be in the no-ringing waiting state while reducing the power consumption in the sleep state.

FIG. 9 is a flow chat illustrating an operation of the facsimile apparatus 100 to exit the sleep state according to the second embodiment of the present disclosure. A program for performing this process is stored in the memory 103, and the CPU 102 executes this program thereby achieving the process shown in the flow chart shown in FIG. 9.

The DC power supply circuit 710 according to the second embodiment does not have a function of generating the pseudo-CI signal used in the first embodiment. Thus, the process shown in the flow chart of FIG. 9 does not include S605 to S607 which are included in FIG. 6 to generate the pseudo-CI signal, while the other steps are similar to those in FIG. 6. Thus, a further description of the flow chart in FIG. 9 is omitted.

According to the second embodiment, as described above, in a case where the external telephone set is set in the waiting state in which ringing is not allowed when the facsimile apparatus is in the sleep state, it is possible to supply, using the circuit, the intermittent off-hook voltage to the hook detection circuit without the CPU having to control the operation. Thus, even in the sleep state, it is possible to detect an occurrence of an off-hook state on the telephone set, which allows a further reduction in power consumption during the sleep state. By changing the duty factor of the intermittent off-hook voltage such that the on-ratio is reduced, it is possible to further reduce the power consumption during the operation in the state in which the telephone set waits for an incoming call without ringing.

According to the present disclosure, it is possible to further reduce power consumption in a state in which the telephone set waits for an incoming call without ringing in the sleep state.

Other Embodiments

Embodiment(s) of the present invention also can be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2016-186141 filed Sep. 23, 2016, which is hereby incorporated by reference herein in its entirety.

What is claimed is:

1. An image communication apparatus to communicate with a telephone set, the image communication apparatus comprising:
   a processor configured to control the image communication apparatus;
   a detector configured to detect off-hook on the telephone set;
   a generator configured to generate an intermittent off-hook voltage; and
   a switch configured to switch a connection state between a state in which the telephone set is connected to a communication line and a state in which the telephone set is connected to the generator,
   wherein, in a case where it is set that the telephone set does not ring according to reception of an incoming call when the image communication apparatus is in a power-saving state and a condition for a transition of the image communication apparatus to the power-saving state is satisfied, power supply to the processor is restricted, the telephone set is connected to the generator by the switching unit, and the intermittent off-hook voltage generated by the generator is supplied to the detector.

2. The image communication apparatus according to claim 1, further comprising a setting unit configured to set a duty factor of on and off periods of the intermittent off-hook voltage,
   wherein the generation unit generates the intermittent off-hook voltage according to the duty factor set by the setting unit.

3. The image communication apparatus according to claim 1, wherein, in a case where the image communication apparatus is set in one of the following modes: an incoming call reception mode, a remote reception mode, a FAX/TEL switching mode, and a manual reception mode, it is set that the telephone set does not ring according to reception of an incoming call when the image communication apparatus is in the power-saving state.

4. The image communication apparatus according to claim 1, wherein, before the image communication apparatus transits to the power-saving state, the processor notifies the generator of a content of the control to be performed by the generator in the power-saving state.

5. The image communication apparatus according to claim 1, wherein, even after the power-saving state is exited, the processor performs control such that the generator generates the intermittent off-hook voltage and supply the resultant intermittent off-hook voltage to the detector.

6. The image communication apparatus according to claim 1,
   wherein the intermittent off-hook voltage includes an on-period in which the intermittent off-hook voltage is output and an off-period in which the intermittent off-hook voltage is not output, and
   wherein the detector is allowed to detect an off-hook state of the telephone set when the intermittent off-hook voltage is in the off-period.

7. The image communication apparatus according to claim 1,
   wherein the generator includes a direct current to direct current (DC-DC) converter, and
   wherein a primary side on an input side of the DC-DC converter and a secondary side on an output side of the DC-DC converter are electrically isolated from each other via a transformer.

8. A method to control an image communication apparatus to communicate with a telephone set, the method comprising:
   controlling, by a processor, the image communication apparatus;
   detecting, by a detector, off-hook on the telephone set;
   generating, by a generator, an intermittent off-hook voltage; and
   switching, by a switch, a connection state between a state in which the telephone set is connected to a communication line and a state in which the telephone set is connected to the generator,
   wherein, in a case where it is set that the telephone set does not ring according to reception of an incoming call when the image communication apparatus is in a power-saving state and a condition for a transition of the image communication apparatus to the power-saving state is satisfied, power supply to the processor is restricted, the telephone set is connected to the generator by the switching unit, and the intermittent off-hook voltage generated by the generator is supplied to the detector.

* * * * *